S. OVERALL.
CULTIVATOR.
APPLICATION FILED APR. 16, 1914.
1,111,231. Patented Sept. 22, 1914.
2 SHEETS—SHEET 2.
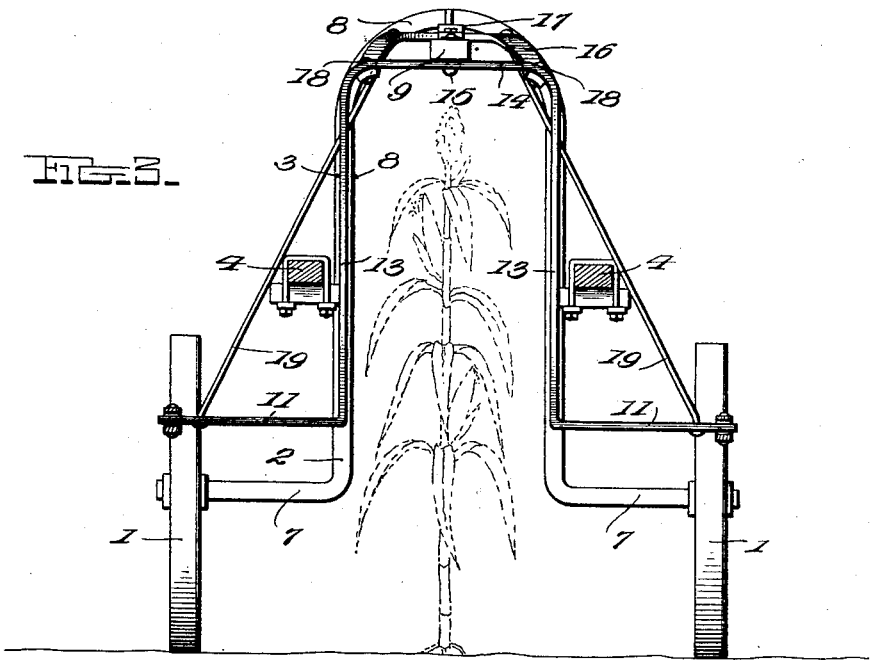
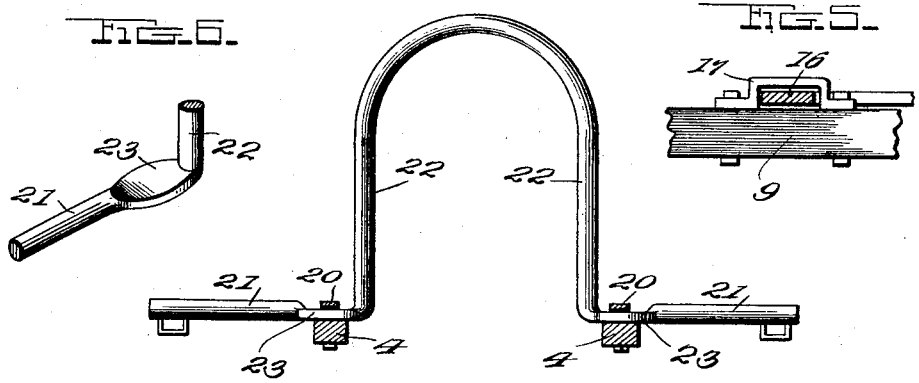
Witnesses
J. R. Pierce
C. Clements
Inventor
Sherman Overall.
By H. B. Willson &Co.
Attorneys

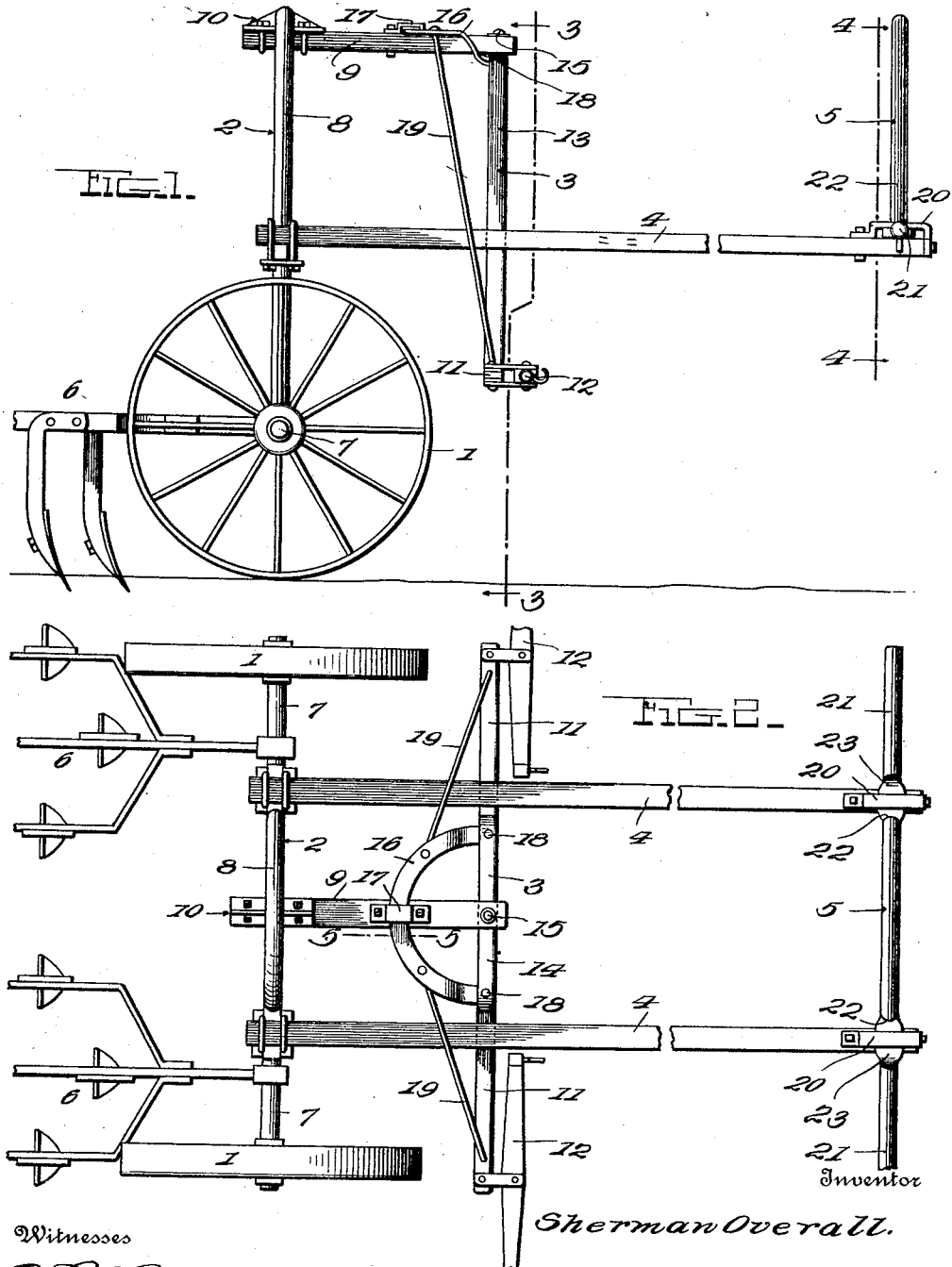

UNITED STATES PATENT OFFICE.

SHERMAN OVERALL, OF MOUNT VERNON, MISSOURI.

CULTIVATOR.

1,111,231. Specification of Letters Patent. Patented Sept. 22, 1914.

Application filed April 16, 1914. Serial No. 832,296.

*To all whom it may concern:*

Be it known that I, SHERMAN OVERALL, a citizen of the United States, residing at Mount Vernon, in the county of Lawrence and State of Missouri, have invented certain new and useful Improvements in Cultivators; and I do declare the following to be a full, clear, and exact description of the invention, such as will enable others skilled in the art to which it appertains to make and use the same.

My invention relates to improvements in agricultural implements, and more particularly to cultivators.

It is a well-known fact that the wheel cultivators in use today are not applicable for the purpose of cultivating corn or other crops, after they have reached a height of approximately two or three feet. It is also a well-known fact that corn, in particular, is greatly assisted in its growth if the process of cultivating the same is continued until it is full grown.

The primary object of my invention, therefore, is to provide a cultivator of the herein described character which is constructed in such a manner as to render it applicable for cultivating full grown corn. To this end, I employ an arched axle, an arched doubletree, a pair of tongues, and an arched neck yoke connecting the forward ends thereof.

A secondary object of the invention is to form a simple and efficient brace for the arched doubletree, which will allow the same to swing upon a pivot and yet will effectually perform its function.

Still another object is to connect the neck yoke to the forward ends of the tongues, in such a manner as to cause the same to readily equalize any back draft applied to the opposite ends thereof, by the draft animals.

With the above objects in view, the invention resides in certain novel features of construction and combination herein described and claimed and shown in the drawings wherein:

Figure 1 is a side elevation of my improved cultivator; Fig. 2 is a plan view thereof; Fig. 3 is a vertical section on the line 3—3 of Fig. 1; the cultivator being omitted; Fig. 4 is a similar view on the line 4—4 of Fig. 1; and Fig. 5 is a detail vertical section taken on the line 5—5 of Fig. 2; and Fig. 6 is a detail perspective view of a portion of the neck yoke.

In the accompanying drawings, I have shown my improved cultivator as comprising, in general, a pair of supporting wheels 1, an arched axle 2, an arched doubletree 3, a pair of tongues 4, an arched neck yoke 5, and a plurality of cultivators 6. The wheels 1 may be of any suitable formation and are revolubly mounted in any appropriate manner upon horizontal portions 7 of the arched axle 2, said horizontal portions being connected by an arch 8, which, as clearly shown in Fig. 3, is of sufficient height to allow its upright portions to straddle rows of full grown corn and to allow its uppermost portion to clear the tops of said rows. The draft beams of the cultivators 6 may be mounted, at their forward ends, upon said horizontal portions 7 or may be attached to any other appropriate part of the axle 2.

Projecting forwardly from the upper end of the arch 8 is a bar 9 which is preferably secured rigidly to said arch by a clamp 10. This bar 9 is employed for the purpose of forming a pivotal support for the arched doubletree 3, the latter comprising horizontal portions 11, to which the swingletrees 12 are loosely connected, upright portions 13 rising from the inner ends of the portions 11 and a cross bar 14 which rigidly connects the upper ends of said bars 13. The cross bar 14 is pivoted at its center, beneath the forward end of the bar 9, by means of a suitable pivot bolt 15. By mounting the doubletree 3 in this manner, it will be seen that the draft will be equalized upon each swingletree 12. It will also be seen that said doubletree must be braced and that no braces can extend across the space between the upright portions of either the axle 2 or said doubletree. It is to be further noted that the ends of the doubletree could not be rigidly braced to the axle, since this would prevent any rocking of said doubletree around its pivot 15. It therefore becomes expedient to provide the bracing means now to be described.

Projecting rearwardly from the opposite ends of the cross bar 14, is a curved segment 16, which, as clearly shown in Fig. 5, overlies the bar 9 and slides loosely beneath a yoke 17, fixed to said bar. The opposite ends of the segment 16 are rigidly secured to the horizontal bar 14, as indicated at 18. The provision of the segment 16 and its mounting would brace the doubletree 3 to an appreciable extent, but I deem it advisable to provide brace bars 19 which are rigidly secured at their lower ends to the horizontal portions 11 of said doubletree, while their upper ends are secured to the segment 16 at points in rear of the forward ends thereof. Thus, it will be seen that I have produced a simple and effective brace for the doubletree 3 which will effectually perform its function and yet will allow said doubletree to rock upon its pivot.

The tongues 4 are preferably secured at their rear ends to the upright side bars of the arch 8, while their forward ends are spaced a distance equal to the width of said arch. The upper side of each forward end of the tongues 4 is provided with a yoke 20, said yokes being provided for the reception of horizontal portions 21 of the neck yoke 5, the upright portions 22 thereof forming the side bars of the arch. By reference to Fig. 2, it will be seen that the outer sides of the bars 22 are spaced a slight distance from the inner sides of the yokes 20, and by reference to Fig. 1, it will be seen that the horizontal portions 21 of the yoke 5, are allowed a slight amount of longitudinal movement between the yokes 20 and the upper sides of the tongues 4. By this construction when either end of the yoke 5 is pulled rearwardly, the opposite end thereof will move forwardly and thus the back draft on said yoke will be equalized. The portions 21 are preferably flattened as shown at 23, said flattened portions engaging the yokes 20 and the upper faces of the tongues 4, and thus preventing the yoke 5 from tipping forwardly or rearwardly. The arched axle 2, the doubletree 3, and the neck yoke 5, may each be formed of a single piece of metal, or if found advisable, they may each be constructed in several sections.

From the foregoing description, taken in connection with the accompanying drawings, it will be seen that I have devised a simple and efficient cultivator which may be employed for the purpose of working the soil between the rows of full grown corn, without the danger of injuring the crop in any manner whatsoever. It may here be stated that the cultivators 6 are not described in detail herein, since it will be readily understood that they may be of any desired construction for co-action with the improved features of the machine. It will be further understood, that although I have described my invention with considerable minuteness, I do not wish to be limited to details of construction or to the proportioning of parts, otherwise than as pointed out in the appended claims.

Having thus described my invention, what I claim as new and desire to secure by Letters-Patent is:

1. An implement comprising an arched axle, a pair of supporting wheels revolubly mounted thereon, a pair of tongues projecting forwardly from the sides of the arch, a bar projecting rigidly forward from the top of the arch, an arched double-tree pivoted at its upper end to said bar, a curved segment secured at its opposite ends to said double-tree and having a sliding connection with said bar.

2. An implement comprising an arched axle, a pair of supporting wheels revolubly mounted thereon, a pair of tongues projecting forwardly from the sides of the arch, a bar projecting rigidly forward from the top of the arch, an arched double-tree pivoted at its upper end to said bar, a curved segment secured at its opposite ends to the arch of said double-tree and having a sliding connection with said bar, and a pair of inclined brace rods secured at their upper ends to said segment and at their lower ends to said double-tree.

3. An implement comprising an arched axle, a pair of supporting wheels revoluble thereon, a pair of tongues projecting forwardly from the sides of the arch, a bar projecting rigidly forward from the top of said arch, an arched double-tree pivoted at its upper end to said bar and having laterally extending portions on its lower ends, a yoke on said bar, a curved segment secured at its opposite ends to the arch of said double-tree and slidable within said yoke, and a pair of brace bars secured at their lower ends to said lateral portions and at their upper ends to said segment in rear of the arch of said double-tree.

4. An implement comprising an arched axle, a pair of supporting wheels revoluble thereon, a pair of tongues projecting forwardly from said axle, an arched double-tree, a yoke on the forward end of each tongue and an arched neck yoke having laterally projecting portions longitudinally and transversely slidable within said yokes.

5. An implement comprising an arched axle, a pair of supporting wheels revolubly mounted thereon, a pair of tongues projecting forwardly from the sides of the arch, a bar projecting rigidly forward from the top of the arch, an arched double-tree pivoted at its upper end to said bar, bracing connections for said double-tree, and an arched neck yoke longitudinally and laterally slidable upon the forward ends of said tongues.

In testimony whereof I have hereunto set my hand in presence of two subscribing witnesses.

SHERMAN OVERALL.

Witnesses:
JOHN C. TURK,
PARKER POTTER.